United States Patent [19]
Matzl

[11] 3,739,256
[45] June 12, 1973

[54] TRANSFER SWITCHING SYSTEM FOR REGULATING TRANSFORMERS INCLUDING THYRISTOR NETWORK AND LOGIC CONTROLS THEREFOR

[75] Inventor: Manfred Matzl, Eberbach/Neckar, Germany

[73] Assignee: Maschinenfabrik Reinhausen Gebruder Scheubeck K.G., Regensburg, Germany

[22] Filed: Jan. 21, 1972

[21] Appl. No.: 219,705

[30] Foreign Application Priority Data
Jan. 29, 1971 Germany.................. P 21 04 076.6

[52] U.S. Cl. .......................................... 323/43.5 S
[51] Int. Cl. ........................... G05f 1/20, H02m 5/12
[58] Field of Search ................................ 323/43.5 S

[56] References Cited
UNITED STATES PATENTS

| | | | |
|---|---|---|---|
| 3,515,980 | 6/1970 | Throop | 323/43.5 S |
| 3,381,213 | 4/1968 | Rice et al. | 323/43.5 S |
| 3,466,530 | 9/1969 | Matzl | 323/43.5 S |
| 3,599,040 | 8/1971 | Ebersohl | 323/43.5 S X |

Primary Examiner—Gerald Goldberg
Attorney—Erwin Salzer

[57] ABSTRACT

A system for performing tap-changing operations on tapped regulating transformers by thyristor networks and disconnect contact means. The trigger pulse generators for the thyristors of the networks are controlled by sensors whose output is fed into a logic circuitry. The latter includes a bistable device and a pair of AND-gates.

3 Claims, 3 Drawing Figures

TRANSFER SWITCHING SYSTEM FOR REGULATING TRANSFORMERS INCLUDING THYRISTOR NETWORK AND LOGIC CONTROLS THEREFOR

BACKGROUND OF THE INVENTION

The starting point of the present invention are so-called Jansen-type tap-changing switching systems for regulating transformers. A conventional Jansen-type tap-changing switching system includes, in addition to a tapped transformer winding, a selector switch and a transfer switch, and the latter is provided with a plurality of tap-changing resistors, or change-over resistors. Modern versions of Jansen-type tap-changing switching systems are disclosed in U.S. Pat. No. 3,396,254 to A. Bleibtreu, Aug. 6, 1968 for ARRANGEMENT FOR AVOIDING EDDY CURRENT LOSSES IN TRANSFER SWITCH AND SELECTOR SWITCH UNITS WITH INTERPOSED GEAR DRIVE and in U.S. Pat. No. 3,493,698 to U.G.E.Schweitzer, Feb. 3,1970 for TAP-CHANGING TRANSFORMER INCLUDING A SELECTOR SWITCH AND A TRANSFER SWITCH. Reference may be had to these patents for a more complete disclosure of Jansen-type tap-changing switching systems.

In more recent times there has been a trend toward substituting in tap-changing transfer switches including thyristors for the more conventional transfer switches with their relatively bulky tap-changing resistors, or change-over resistors. Typical examples of tap-changing switching systems including thyristors are disclosed in U.S. Pat. No. 3,502,961 to M.Matzl,Mar. 24, 1970 for TAP-CHANGING THYRISTOR CIRCUITRY FOR REGULATING TRANSFORMERS; U.S. Pat. No. 3,534,246 to M.Matzl, Oct. 13, 1970 for TAP-CHANGING SYSTEM INCLUDING THYRISTORS FOR EFFECTING TAP-CHANGES IN THREE-PHASE TRANSFORMERS and U.S. Pat. No. 3,579,092 to M. Matzl, May 18, 1971 for TAP-CHANGING REGULATING TRANSFORMER WITH SOLID STATE CIRCUITRY. The present invention is an immediate outgrowth of the systems disclosed in detail in the three above patents to M. Matzl to which reference may be had for certain details which will not be described below to avoid unnecessary repetitions.

The systems disclosed in the three above patents to M.Matzl include thyristor circuits and mechanical switching devices having relatively movable contacts. The latter must be operated in a predetermined sequence and timing. One object of this invention is to provide systems as disclosed in the above patents to M.Matzl with logic circuitry to automate the operation thereof.

Conventional transfer switches including tap-changing resistors, or change-over resistors, as disclosed in the aforementioned U.S. Pats. Nos. 3,396,254 and 3,493,698 have other sequences of engagement and timing, and of separation and timing of the relatively movable contacts thereof than required in a thyristor system as disclosed in the three above patents to M.Matzl. It is desirable to eliminate in conventional designs of transfer switches the tap-changing or change-over resistors thereof, to associate such transfer switches with switch-over thyristor networks as shown in U.S. Pat. Nos. 3,502,691; 3,534,246 and 3,579,092 to M.Matzl and to provide means which enable such a drastic change of the entire system without changing the sequence and timing of contact engagement and contact separation of the constituent contacts of a more or less conventional Jansen-type transfer switch. It is another object of this invention to provide means which allow a transfer switch originally designed to be operatively related to tap-changing resistors, or change-over resistors, to be operatively related to thyristor networks as shown in the above Matzl references.

My co-pending U.S. Pat. application Ser. No.219,706, filed 1/21/72 for LOGIC-CONTROLLED THYRISTOR SYSTEM FOR PERFORMING TAP-CHANGING OPERATIONS, now U.S. Pat. No. 3,710,232 issued Jan. 9, 1973 discloses a system solving the same problem as that outlined above with means similar to those which are disclosed below. In other words, both systems make it possible to combine conventional Jansen-type transfer switches with their particular contact timing and thyristor networks rather than switch-over resistors for effecting tap-changing operations.

SUMMARY OF THE INVENTION

Tap-changing switching systems or tap-changing transfer switches embodying this invention include a pair of thyristor networks instead of change-over resistors and further include a pair of disconnect switch means each connected in series with one of said pair of thyristor networks. The system further includes a pair of voltage sensors each sensing the voltage prevailing across the series arrangement of one of said thyristor networks and that of the particular disconnect switch means which is connected in series with that thyristor network. The system further includes a pair of position sensors each sensing the position one of said pair of disconnect switch means is in. The output of said pair of voltage sensors and the output of said pair of position indicators is fed into a logic system the output of which controls a pair of trigger pulse generators for triggering the constituent thyristors of the aforementioned pair of thyristor networks.

DESCRIPTION OF PREFERRED EMBODIMENT OF THE INVENTION

Figure 1:
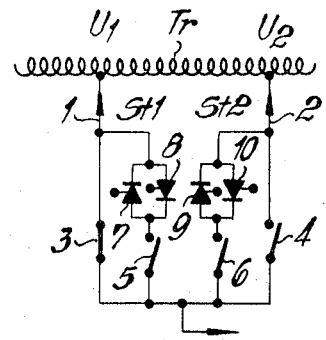
FIG. 1 is a diagram of a tap-changing system including thyristor circuits to which the invention is intended to be applied.

Referring now to FIG. 1, numerals 1 and 2 have been applied to indicate contacts of a selector switch engaging taps $U_1,U_2$ of a tapped transformer winding Tr. The system includes two thyristor networks $St_1$ and $St_2$. The former network is made up of a pair of inversely parallel connected transistors 7,8 and the latter network is made up of a pair of inversely parallel connected thyristors 9,10. Network $St_1$ is connected in series with disconnect switch 5 and network $St_2$ is connected in series with disconnect switch 6. Current-carrying switch 3 is arranged to be shunted across network $St_1$ and disconnect 5, while current-carrying switch 4 is arranged to be shunted across network $St_2$ and disconnect 6. Reference character Y has been applied to indicate an outgoing, load current-carrying line.

Assuming it is intended to change from tap $U_1$ to tap $U_2$. This is initiated by closing both disconnects or disconnect contacts 5,6. Thereupon the flow of load current is transferred or commutated from thyristors 7,8 to thyristors 9,10. Finally the current-carrying switch 4 is closed and disconnects 5,6 are opened, thus causing the load current to flow from tap $U_2$ by way of current-carrying switch 4 directly to outgoing line Y. Current-carrying switch 3 is opened shortly after closing of disconnects 5,6.

The sequence and timing of contact operation in conventional Jansen-type transfer switches is not quite that which has been indicated above. That sequence and timing of conventional Jansen-type transfer switches has been shown in FIG. 2 where duration of contact operation is plotted against time. It is apparent from FIG. 2 that in conventional Jansen-type transfer switches the times of operation of the current-carrying contacts 3,4 thereof and of the disconnect contacts 5,6 thereof overlap.

Figure 2:
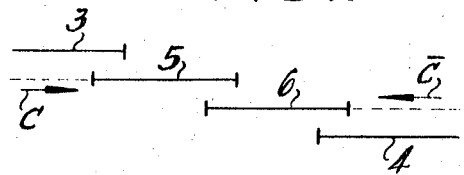
FIG. 2 is a diagrammatic representation of the sequence and timing of contact operations in a system as shown in FIG. 1 but including a transfer switch initially designed to be associated with ohmic change-over resistors rather than thyristor networks.
Figure 3:
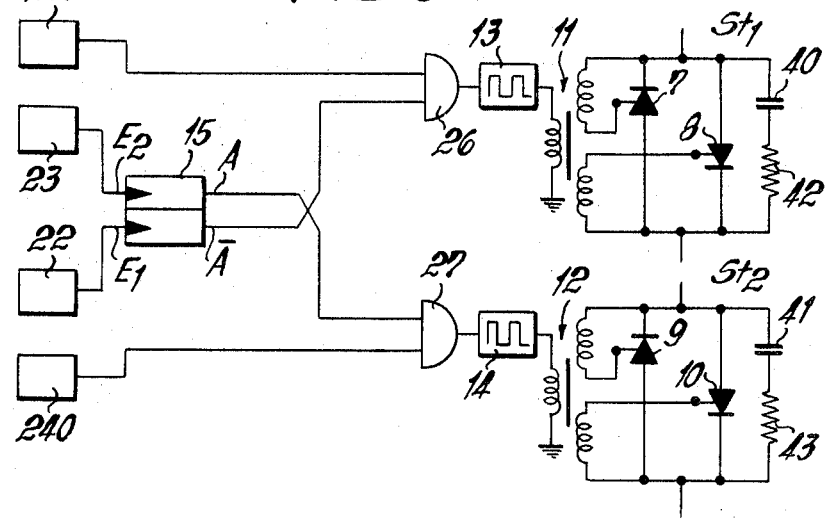
FIG. 3 is a circuit diagram of logic circuitry embodying the present invention.

This raises the problem of adapting a switch mechanism having an overlapping operating sequence such as shown in FIG. 2 to control a pair of thyristor networks as shown in FIG. 1 to effect a tap-changing operation from a first tap $U_1$ to a second tap $U_2$, or vice versa from a second tap $U_2$ to a first tap $U_1$. FIG. 3 shows diagrammatically a circuitry which offers a solution to the above problem. The same reference characters have been applied in FIGS. 1 and 3 to indicate like parts.

Thus in FIG. 3 reference character $St_1$ has been applied to indicate a first network including a pair of thyristors 7,8 inversely connected in parallel and reference character $St_2$ has been applied to indicate a second network including a pair of thyristors 9,10 inversely connected in parallel. The network $St_1$ further includes capacitor 40 and resistor 42 which are connected in series and the network $St_2$ further includes the capacitor 41 and the resistor 43 which are connected in series. Thyristors 7,8 may be triggered by trigger pulse transformer 11 the primary winding of which may be energized by trigger pulse generator 13. Thyristors 9,10 may be triggered by trigger pulse transformer 12 the primary winding of which may be energized by trigger pulse generator 14.

Reference character 15 has been applied to indicate a switching-direction-responsive memory device. Device 15 has two dynamic input terminals $E_1$ and $E_2$ and two output terminals A and $\overline{A}$. Applying a voltage to input terminal $E_2$ results in a voltage at output terminal A and applying a voltage at input terminal $E_1$ results in a voltage at inverse output terminal $\overline{A}$. The memory device 15 stores information regarding the direction of changes between taps $U_1, U_2$. In its condition $c$ there is an output at output terminal A indicative of a switching operation from current-carrying contacts 3 to current-carrying contacts 4. Device 15 is in the state $\overline{c}$ and there is a voltage signal at terminal $\overline{A}$ if the direction of the switching operation is inverted, i.e., from current-carrying contact 4 to current-carrying contact 3. Reference numerals 240 and 250 have been applied to indicate voltage sensors. Sensor 240 senses the voltage prevailing across thyristor network $St_1$ and disconnect switch or disconnect contacts 5 and sensor 250 senses the voltage prevailing across both thyristor network $St_2$ and disconnect switch or disconnect contacts 6. The sensors 22 and 23 sense the positions in which disconnect contacts or disconnect switchs 5 and 6 are in. Sensors for the blocking voltages across thyristors 7,8 and 9,10 are not needed in the particular circuitry of FIG. 3 and there is likewise no need in the circuitry of FIG. 3 for sensors for sensing the positions of current-carrying contacts or current-carrying switches 3 and 4, respectively. The sensors 240,250 must be capable of sensing continuously the voltage across network $St_1$ and disconnect means 5, and that across network $St_2$ and disconnect means 6. The circuitry of FIG. 3 further includes a pair of AND-gates 26 and 27 having outputs which activate and de-activate trigger pulse generators 13 and 14. The inputs of AND-gate 26 are derived from the outputs of memory device 15 and of voltage sensor 250, and the inputs of AND-gate 27 are derived from the outputs of memory device 15 and voltage sensor 240.

The memory device 15 is preferably a bistable system whose dynamic input terminals are under the control of the position sensors 22,23 of disconnect means 5,6. If disconnect means or disconnect switch 6 is closed, bistable circuitry 15 may assume the state in which there is a voltage at output terminal A and remain in that state until disconnect means or disconnect switch 6 is opened incident to the next tap-changing operation when bistable circuitry 15 assumes its other state in which there is a voltage at the inverse output terminal $\overline{A}$.

In the particular circuitry of FIG. 3 each network $St_1, St_2$ operates independently of the positions in which the current-carrying contacts, or current-carrying switches 3,4 of FIG. 1 are in. Hence the current-carrying contacts or current-carrying switches 3, 4 of FIG. 1 may be dispensed with, or deleted, provided that the pairs of thyristors 7,8 and 9,10 have sufficient current-carrying capacity to carry continuously the current supplied by tapped transformer winding Tr.

Referring now to the operation of the circuitry of FIGS. 1 and 3, assuming that current-carrying contacts 3 are initially closed and that disconnect contacts 5,6 as well as the current-carrying contacts 4 are initially open. In other words, the current flowing through outgoing line Y is initially derived from tap $U_1$. In that condition the direction sensitive memory device is in its state $\overline{c}$ wherein a voltage signal prevails at the inverse output terminal $\overline{A}$. In that condition the network $St_2$ is not carrying current and taps $U_1, U_2$ are not short-circuited and, therefore, there is a voltage at the output terminal of voltage sensor 250. Hence there are inputs at both input terminals of AND-gate 26, and there is an output signal at the output terminal of AND-gate 26 causing trigger generator 13 to become operative and to trigger thyristors 7 and 8.

As soon as current-carrying contacts 3 open or separate, thyristors 7,8 are caused to carry the entire load current. When disconnect contacts 6 close sensor 23 emits an output signal to the input terminal $E_2$ of memory device 15. As mentioned above, device 15 may be a bistable system which changes its state when one of its dynamic inputs $E_1, E_2$ changes from zero to a predetermined voltage level. The voltage applied from sensor 23 to input $E_2$ of bistable device 15 causes a change of state thereof as a result of which a voltage appears at output terminal A and the voltage which had prevailed at output terminal $\overline{A}$ disappears. This, in turn, causes cessation of a signal at the output terminal of AND-gate 26, and renders trigger pulse generator 13 inoperative so that no trigger pulses are applied any longer to thyristors 7 and 8. Therefore thyristors 7 and 8 begin to block following the next current zero. As a result of blocking of thyristors 7 and 8 there appears an output voltage at voltage sensor 240. Now a voltage signal is applied to each of the two input terminals of AND-gate 27. This causes appearance of a voltage at the output terminal of AND-gate 27, activation of trigger pulse generator 14 and triggering the thyristors 9 and 10. Upon triggering of thyristors 9 and 10 the latter carry the load current supplied by tapped winding Tr. The opening of disconnect contacts 5 has no particular operational significance in the circuitry of FIGS. 1 and 3 since network $St_1$ is not carrying current at this point of time. Upon closing of current-carrying contacts 4, thyristors 9,10 are shunted by a current path of relatively larger conductivity. However, trigger pulse generator 14 continues to supply thyristors 9 and 10 with trigger pulses, thus maintaining them in their conductive state. This means that the supply of load current to outgoing line Y would not be interrupted even if current-carrying contacts 4 were dispensed with. In that case thyristors 9 and 10 would, however, require a considerably larger continuous current-carrying capacity than in the presence of current-carrying contacts 4.

Now the circuitry is ready for a reverse tap-changing operation, i.e., one from tap $U_2$ and current-carrying contacts 4 to tap $U_1$ and current-carrying contacts 3.

The circuitry of FIGS. 1 and 3 require that there be an overlap of the operation of disconnect contacts 5,6, i.e., that both contacts remain simultaneously closed for a period of time lasting at least half a period of the current wave. If this condition were not met it might occur that one of the disconnect contacts 5,6 — i.e., the one that had been carrying the load current — would be compelled to part under load, or break the load current, because its associated thyristors have not as yet turned to the blocking state thereof.

FIGS. 1 and 3 illustrate the preferred embodiment of the invention. It will be apparent that the memory device 15 must not necessarily be a bistable device such as a multivibrator, and that the gates 26,27 must not necessarily be AND-gates. The sensors 22 and 23 may be embodied by various devices and the same applies to sensors 240 and 250. The essence of the invention may be seen in controlling trigger pulse generators 13,14 by sensing means and logic means subject to the same Boolean algebraic term as the specific embodiment of the invention shown in FIGS. 1 and 2 and described in the context thereof. This Boolean algebraic term may be expressed as follows:

$$c(\overline{c}) \times g$$

wherein $c$ signifies the direction of change from one of the pair of taps to the other, e.g., from tap $U_1$ to tap $U_2$; $\overline{c}$ signifies the direction of change from said other of said pair of taps $U_2$ to said one of said pair of taps $U_1$, and $g$ stands for the state of one of the pair of networks $St_1, St_2$ and its respective disconnect contact means 5,6.

I claim as my invention:

1. A system for performing tap-changing operations on tapped windings of regulating transformers including a. a pair of thyristor networks each adapted to be conductively connected to one of a pair of taps of a tapped transformer winding, each of said pair of networks including a pair of inversely parallel connected thyristors;

b. a pair of disconnect contact means each connected in series with one of said pair of networks and each arranged to selectively connect one of said pair of networks to a load current-carrying line and to disconnect one of said pair of networks from said load current-carrying line;

c. means for triggering the constituent thyristors of each of said pair of networks, said triggering means including a pair of trigger pulse generators each operatively related to the constituent thyristors of one of said pair of networks;

d. a pair of voltage sensors each sensing the voltage prevailing across one of said pair of networks and one of said pair of disconnect contact means, each of said pair of voltage sensors having an output voltage state and a no output voltage state;

e. a pair of position sensors each sensing the position in which one of said pair of disconnect contact means is in, each of said position sensors having an output voltage state and a no output voltage state; and f. a logic circuitry under the control of said pair of voltage sensors and under the control of said pair of position sensors controlling the operation of said pair of trigger pulse generators so that the respective states of operativeness and inoperativeness of each of said pair of trigger pulse generators is dependent upon both the state of one of said pair of voltage sensors and the state of one of said pair of position sensors.

2. A system as specified in claim 1 wherein said logic circuitry includes a bistable memory device having two inputs and two outputs undergoing a change of state in response to a change of one of said inputs thereof, each of said two inputs of said bistable memory device being connected to one of said pair of position sensors, said logic circuitry further including a pair of AND-gates each having two inputs, one of said two inputs of each of said pair of AND-gates being connected to one of said two outputs of said bistable memory device, and the other input of each of said pair of AND-gates being connected to one of said pair of voltage sensors, the output of each of said pair of AND-gates controlling one of said pair of trigger pulse generators.

3. A system for performing tap-changing operations on tapped windings of regulating transformers including a. a pair of thyristor networks each adapted to be conductively connected to one of a pair of taps of a tapped transformer winding, each of said pair of networks including a pair of inversely parallel connected thyristors;

b. a pair of disconnect contact means each connected in series with one of said pair of networks and each arranged to selectively connect one of said pair of networks to a load current-carrying line and to disconnect one of said pair of networks from said load current-carrying line;

c. means for triggering the constituent thyristors of each of said pair of networks, said triggering means including a pair of trigger pulse generators each operatively related to the constituent thyristors of one of said pair of networks; and d. means for controlling said pair of trigger pulse generators in accordance with the Boolean term $$c(\bar{c}) \times g$$

wherein $\bar{c}$ signifies the direction of change from one of said pair of taps to the other of said pair of taps;

$c$ signifies the direction of change from said other of said pair of taps to said one of said pair of taps; and $g$ signifies the state of one of said pair of networks and of one of said pair of disconnect contacts connected in series with said one of said pair of networks.

* * * * *